United States Patent
Scheelen et al.

(10) Patent No.: US 7,052,754 B2
(45) Date of Patent: May 30, 2006

(54) POLYETHYLENE-BASED COMPOSITION AND PROCESS FOR THE MANUFACTURE OF ARTICLES SHAPED FROM THE COMPOSITION

(75) Inventors: André Scheelen, Brussels (BE); Wim Coppens, Merelbeke (BE)

(73) Assignee: Innovene Manufacturing Belgium, NV, Antwerpen (BE)

( * ) Notice: Subject to any disclaimer, the term of this patent is extended or adjusted under 35 U.S.C. 154(b) by 661 days.

(21) Appl. No.: 09/115,229

(22) Filed: Jul. 14, 1998

(65) Prior Publication Data

US 2002/0006486 A1    Jan. 17, 2002

(30) Foreign Application Priority Data

Jul. 14, 1997    (BE) .................................... 9700619

(51) Int. Cl.
  *C08K 3/00*    (2006.01)
  *B29D 22/00*    (2006.01)

(52) U.S. Cl. ...................... 428/36.9; 428/332; 428/339; 524/451; 525/240; 138/DIG. 7; 264/513; 264/515

(58) Field of Classification Search .............. 428/34.1, 428/36.92, 332, 35.7, 339, 36.9; 525/240; 138/118, DIG. 7; 264/513, 514, 515, 478, 264/464; 524/451
See application file for complete search history.

(56) References Cited

U.S. PATENT DOCUMENTS

| | | | | |
|---|---|---|---|---|
| 4,762,860 A * | 8/1988 | Park | ............................ | 521/134 |
| 4,806,293 A * | 2/1989 | Akiyama et al. | ............. | 264/51 |
| 4,847,150 A * | 7/1989 | Takeda | ......................... | 264/53 |
| 5,049,441 A | 9/1991 | Jenkens et al. | | |
| 5,631,069 A * | 5/1997 | Wooster et al. | ............. | 428/220 |
| 5,803,131 A * | 9/1998 | Iwasa et al. | ................ | 138/137 |

FOREIGN PATENT DOCUMENTS

| | | | |
|---|---|---|---|
| AU | 81126/82 | | 9/1982 |
| AU | 11485/88 | | 8/1988 |
| EP | 0060178 A1 | | 9/1982 |
| EP | 0278470 A2 | | 8/1988 |
| EP | 0716119 A1 | | 6/1996 |
| GB | 822498 | * | 5/1957 |
| IT | 719725 | | 11/1966 |
| JP | 09176328 A | | 12/1995 |
| WO | WO85/03194 | | 8/1985 |

* cited by examiner

*Primary Examiner*—Rena L. Dye
(74) *Attorney, Agent, or Firm*—Venable LLP; Marina V. Schneller

(57) ABSTRACT

Polyethylene-based composition for which the standard density, measured at 23° C. according to ASTM Standard D 792, is greater than 940 kg/m$^3$ and which comprises talc in an amount of less than 1 part per 100 parts by weight of polyethylene. The composition is preferably in the form of extruded granules. It exhibits a markedly improved creep resistance. Process for the manufacture of shaped articles and articles shaped from the composition, in particular pipe couplings and pipes intended for the transportation of pressurized fluids.

16 Claims, No Drawings

POLYETHYLENE-BASED COMPOSITION AND PROCESS FOR THE MANUFACTURE OF ARTICLES SHAPED FROM THE COMPOSITION

BACKGROUND OF THE INVENTION

The present invention relates to a polyethylene-based composition, to a process for the manufacture of shaped articles and to the articles shaped from this composition. It relates more particularly to a composition based on high density polyethylene containing small amounts of finely divided inorganic additive and to the articles shaped from this composition, in particular pipes intended for the transportation of fluids and in particular of pressurized fluids.

It is known to improve the antiblocking properties of films made of low to medium density polyethylene by incorporation, in the polyethylene, of small amounts (approximately 0.05 to 1%) of finely divided inorganic materials, such as talc, kaolin or silica (Italian Patent 719,725). More recently, the incorporation of 200 to 2500 ppm (0.02 to 0.25%) of talc has been specifically recommended in order to improve the antiblocking properties of films made of polyethylene having a density of between 0.905 and 0.935 g/cm$^3$, without having a significant effect on the transparency (Patent EP-B-60178).

Furthermore, it is known to use polyethylene and in particular high density polyethylene for producing pipes and couplings for the transportation of pressurized fluids. In this application, it is essential, for obvious reasons of safety and of longevity of fluid transportation plants, to have available shaped articles, such as pipes and couplings, which exhibit very high resistance to hydrostatic pressure.

The aim of the present invention is to provide a composition based on high density polyethylene which exhibits a markedly improved resistance to hydrostatic pressure and consequently a markedly improved creep resistance.

To this end, the invention relates to a composition based on polyethylene, the standard density of which, measured at 23° C. according to ASTM Standard D 792, is greater than 940 kg/m$^3$, comprising talc in an amount of less than 1 part per 100 parts by weight of polyethylene.

The talc which can be used in the compositions according to the invention can be any magnesium silicate hydrate of natural origin of general formula 3MgO.4SiO$_2$.H$_2$O. It can contain minor amounts of metal oxides, such as aluminium, iron and calcium oxides. The talc advantageously has an essentially lamellar texture. Its particle size distribution is preferably situated between 0.2 and 15 microns and its mean particle size between 1 and 5 microns.

SUMMARY OF THE INVENTION

The present invention results from the surprising observation that the addition of small amounts of talc, of less than 1 part by weight per 100 parts by weight of high density polyethylene, provides compositions which make possible the manufacture of shaped articles, such as pipes, for which the creep resistance is significantly improved without affecting the other mechanical properties of the said shaped articles, such as the resistance to the slow propagation of cracks (stress cracking or ESCR).

DETAILED DESCRIPTION OF THE DESCRIPTION

Advantageous results are already obtained with an amount of talc as low as 0.01 part per 100 parts by weight of polyethylene. Generally, the amount of talc will be at least equal to 0.03 part by weight. In general, it will not exceed 0.5 part by weight. Excellent results are obtained with an amount of talc of between 0.05 and 0.25 part per 100 parts by weight of polyethylene.

Polyethylene is understood to denote, for the purposes of the present invention, both ethylene homopolymers and its copolymers with one or more monomers and their mixtures. Mention may be made, among comonomers which can be used, of linear or branched olefins containing from 3 to 8 carbon atoms, such as, for example, butene, hexene and 4-methylpentene, and diolefins comprising from 4 to 18 carbon atoms, such as 4-vinylcyclohexene, dicyclopentadiene, 1,3-butadiene, and the like. The preferred comonomers are butene and hexene.

The total content of comonomer(s) in the ethylene copolymer generally amounts to at least 0.01 mole % and most often to at least 0.05 mole %. The total amount of comonomer(s) usually does not exceed 10 mole % and most often 5 mole %. Good results are obtained with ethylene copolymers containing, in total, from 0.05 to 5 mole % and more particularly still from 0.3 to 2 mole % of butene and/or of hexene. Mention may be made, as non-limiting examples of ethylene copolymers advantageously employed in the compositions according to the invention, of random co- and terpolymers of ethylene and of butene and/or of hexene or alternatively of copolymers with a bimodal distribution of molecular masses obtained by sequential polymerization of mixtures of ethylene and of butene and/or of hexene. The copolymers with a bimodal distribution obtained by sequential polymerization of ethylene and of a mixture of ethylene and of butene are particularly well suited.

Use is advantageously made of polyethylene for which the standard density, as defined above, is at least equal to 943 kg/m$^3$ and more particularly at least equal to 946 kg/m$^3$. The standard density generally does not exceed 960 kg/m$^3$ and more particularly does not exceed 955 kg/m$^3$.

The polyethylene employed in the composition according to the invention is, in addition, most often characterized by a melt flow index, measured at 190° C. under a load of 5 kg according to ISO Standard 1133 (1991), of at least 0.07 g/10 min, values of at least 0.1 g/10 min being the commonest. The melt flow index generally does not exceed 5 g/10 min and most often does not exceed 2 g/10 min.

In addition to the talc, the composition according to the present invention can comprise additives usual for ethylene polymers, such as stabilizers (for example, antiacids, antioxidants and/or UV stabilizers) and processing aids. The content of each of these additives in the composition is generally less than 1%, preferably less than 0.5%, by weight. The composition according to the invention can also comprise pigments. The content of pigments generally does not exceed 5% by weight of the composition and more particularly does not exceed 3% by weight.

The composition according to the invention generally comprises at least 94%, preferably at least 96%, by weight of polyethylene.

The method of preparation of the composition according to the invention is not critical. The composition can be obtained by any appropriate means known. It is possible, for example, to incorporate the talc in the polyethylene at the same time as the usual additives in the form of a powder mixture. A preferred alternative method consists in mixing the polyethylene with the talc and the usual additives at room temperature and in subsequently mixing them at a temperature greater than the melting temperature of the polyethylene, for example in a mechanical mixer or an extruder. It is also possible, in a first step, to prepare a master batch comprising a first polyethylene fraction, the talc and the usual additives as defined above, this master batch being rich in talc. The content of talc in this master batch is generally from 0.5 to 5% by weight, preferably from 0.5 to 2% by weight and more particularly from 0.75 to 1.5% by weight. This master batch is subsequently mixed with the remaining polyethylene fraction. These methods make it possible to obtain the composition in the form of a powder which can optionally be subsequently subjected to granulation, in order to obtain the composition in the form of granules. These granules are obtained, in a known way, by extrusion of the composition, the rod exiting from the extruder being cut into granules. The granulation process can be carried out by feeding an extruder with a preprepared mixture of polyethylene with the talc (and optionally the usual additives) and by collecting granules at the outlet of the plant. An alternative form of the granulation process consists in introducing a master batch as described above and the remaining polyethylene fraction into the extruder.

Preference is given to the compositions which are in the form of extruded granules.

The composition according to the invention generally exhibits a standard density (measured as defined above) of greater than 940 kg/m$^3$ and, most often, at least equal to 945 kg/m$^3$ and more particularly at least equal to 947 kg/m$^3$. The standard density of the composition generally does not exceed 970 kg/m$^3$ and more particularly 965 kg/m$^3$.

The composition according to the invention usually exhibits a melt flow index, measured at 190° C. under a load of 5 kg according to ISO Standard 1133 (1991), of at least 0.07 g/10 min, values of at least 0.1 g/10 min being the commonest. The melt flow index generally does not exceed 5 g/10 min and most often does not exceed 2 g/10 min.

The composition according to the invention results, by processing in the molten state, in shaped articles which exhibit a very markedly improved creep resistance by comparison with identical compositions not containing talc.

The composition according to the invention can be employed according to any conventional process for the manufacture of shaped polyethylene articles, such as extrusion, extrusion-blow moulding, extrusion-thermoforming and injection processes. It is well suited to the injection of pipe couplings. It is very particularly well suited to the extrusion of pipes, in particular of pipes intended for the transportation of pressurized fluids, such as water and gas.

The present invention consequently also relates to a process for the manufacture of articles shaped from the composition according to the invention. The invention relates in particular to a process for the manufacture of pipe couplings by injection of a composition according to the invention. The injection of the composition according to the invention is carried out in conventional plants and under conventional conditions for the injection of compositions based on ethylene polymers at temperatures preferably situated in the vicinity of 240 to 280° C. The invention also relates to a process for the extrusion of pipes, in particular of pipes intended for the transportation of fluids, in particular pressurized fluids. The extrusion of the composition according to the invention, which is preferably in the form of extruded granules, is carried out in conventional plants and under conventional conditions for the extrusion of compositions based on ethylene polymers well known to a person skilled in the art at temperatures situated in the vicinity of 185 to 210° C.

The invention also relates to articles shaped from the composition according to the invention and in particular to pipe couplings obtained by injection of the composition and to pipes obtained by extrusion of the composition. The invention more particularly relates to pipes intended for the transportation of fluids, in particular of pressurized fluids, shaped by extrusion of the composition according to the invention. In addition to a markedly improved resistance to hydrostatic pressure, that is to say creep resistance, the pipes manufactured by means of the composition according to the invention exhibit a very good resistance to slow cracking (stress cracking).

The following example is intended to illustrate the invention. The meaning of the symbols used in this example (and in the reference example), the units expressing the properties mentioned and the methods for measuring these properties are explained hereinbelow.

SD=standard density measured at 23° C. according to ASTM Standard D 792.

MI$_5$=melt flow index, measured at 190° C. under a load of 5 kg according to ISO Standard 1133 (1991).

t=creep resistance expressed in terms of time to fracture, measured according to ISO Standard 1167 (1996) at 20° C. on a pipe having a diameter of 50 mm and a thickness of 3 mm and under a circumferential stress of 12.4 MPa.

ESCR=resistance to the slow propagation of cracks, expressed in terms of time to fracture, measured on a notched pipe according to the method described in ISO Standard F/DIS 13479 (1996) at 80° C. on a pipe having a diameter of 110 mm and a thickness of 10 mm and under a stress of 4.6 MPa.

RCP=resistance to the rapid propagation of cracks, measured at a temperature of −15° C. according to the S4 method described in ISO Standard F/DIS 13477 (1996) on a pipe having a diameter of 110 mm and a thickness of 10 mm.

EXAMPLE 1

A composition was prepared comprising, per kg of composition, the following ingredients:

989.9 g of an ethylene copolymer comprising a bimodal molecular mass distribution having an MI$_5$ of 0.45 g/10 min and an SD of 948.5 kg/m$^3$. This copolymer comprises 50% by weight of an ethylene homopolymer and 50% by weight of a copolymer of ethylene and of butene comprising 1 mole % of monomer units derived from 1-butene, 4.6 g of a mixture of blue, black and white pigments, 2.5 g of an antioxidizing agent, 1 g of calcium stearate, 1 g of a UV stabilizer, and 1 g of talc of Steamic® 00S (Luzenac) quality. This talc exhibits a lamellar structure. It is composed of particles with a diameter varying from 0.3 to 10 μm, the mean particle size being 1.8 sun.

This composition was granulated at a temperature of 210° C. on a ZSK 40 extruder-granulator (sold by the company Werner & Pfleiderer). The granules obtained exhibited an MI$_5$ of 0.44 g/10 min and an SD of 951.9 kg/m$^3$.

Pipes were then manufactured by extrusion of these granules on an extruder of single-screw type (Battenfeld type) at 190° C.

The mechanical properties measured on these pipes are presented in Table I.

COMPARATIVE EXAMPLE

A composition identical to that of Example 1 was prepared, except that it did not comprise talc. This composition was granulated and pipes were manufactured under the same conditions as in Example 1. The granules exhibited an $MI_5$ of 0.43 g/10 min and an SD of 951.4 kg/m$^3$.

The mechanical properties measured on these pipes are presented in Table I.

TABLE I

|  | Example 1 | Comparative Example (talc-free composition) |
|---|---|---|
| t (hours) | 342 | 134 |
| ESCR (hours) | >2500 | >2500 |
| RCP (bar) | 2 to 3 | 2 to 3 |

These tests show that the composition of Example 1 comprising a small amount of talc makes it possible to obtain pipes having a markedly improved resistance to hydrostatic pressure (creep resistance) with respect to an identical composition not comprising talc.

What is claimed is:

1. An article of manufacture selected from the group consisting of a pipe and a pipe coupling comprising a polyethylene-based composition wherein the polyethylene exhibits a standard density, measured at 23° C. according to ASTM Standard D 972, of greater than 940 kg/m$^3$ and wherein the polyethylene-based composition comprises talc in an amount of less than 1 part per 100 parts by weight of polyethylene.

2. The article of claim 1, wherein said talc exhibits a particle size distribution situated between 0.2 and 15 microns and a mean particle size between 1 and 5 microns.

3. The article of claim 1, comprising an amount of talc which is between 0.05 and 0.25 part per 100 parts by weight of polyethylene.

4. The article of claim 1, wherein polyethylene is selected from the group consisting of ethylene homopolymer and ethylene copolymer containing, in total, from 0.01 to 10 mole % of at least one comonomer and exhibiting a standard density of greater than 943 kg/m$^3$ and not exceeding 960 kg/m$^3$ and a melt flow index, measured at 190° C. under a load of 5 kg according to ISO Standard 1133 (1991), of 0.07 to 5 g/10 min.

5. An article of manufacture according to claim 4, characterized in that the polyethylene is selected from the group consisting of ethylene copolymer containing, in total, from 0.05 to 5 mole % of butene and/or of hexene.

6. The article of manufacture of claim 1, wherein said article is a pipe shaped by extrusion molding.

7. The article of manufacture of claim 1, wherein said article is a pipe coupling shaped by injection molding.

8. The article of claim 1, wherein talc is added in an amount effective to increase a creep resistance of said article.

9. The article of manufacture of claim 1, characterized in that the talc exhibits an essentially lamellar texture.

10. The article of manufacture of claim 1, which is characterized by creep resistance (t), wherein t=creep resistance expressed in terms of time to fracture, measured according to ISO Standard 1167 (1996) at 20° C. on a pipe having a diameter of 50 mm and a thickness of 3 mm and under a circumferential stress of 12.4.

11. The article of manufacture of claim 2, which is characterized by creep resistance (t), wherein t=creep resistance expressed in terms of time to fracture, measured according to ISO Standard 1167 (1996) at 20° C. on a pipe having a diameter of 50 mm and a thickness of 3 mm and under a circumferential stress of 12.4.

12. The article of manufacture of claim 1, wherein the polyethylene is high density polyethylene.

13. An article of manufacture selected from the group consisting of pipe and pipe coupling, which comprises polyethylene wherein the polyethylene exhibits a standard density, measured at 23° C. according to ASTM Standard D 972, of greater than 940 kg.m$^3$ and talc in an amount which does not exceed 0.5 part per 100 parts by weight of polyethylene.

14. The article of manufacture of claim 13, wherein talc is added in an amount effective to increase a creep resistance of said article.

15. The article of manufacture of claim 13, which is characterized by creep resistance (t), wherein t=creep resistance expressed in terms of time to fracture, measured according to ISO Standard 1167 (1996) at 20° C. on a pipe having a diameter of 50 mm and a thickness of 3 mm and under a circumferential stress of 12.4.

16. The article of manufacture of claim 13, wherein the polyethylene is high density polyethylene.

\* \* \* \* \*